United States Patent
Kaufman et al.

(10) Patent No.: US 9,385,877 B2
(45) Date of Patent: Jul. 5, 2016

(54) MULTICAST SYSTEMS, METHODS, AND COMPUTER PROGRAM PRODUCTS

(75) Inventors: Matthew Kaufman, Bonny Doon, CA (US); Michael Thornburgh, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2282 days.

(21) Appl. No.: 12/211,700

(22) Filed: Sep. 16, 2008

(65) Prior Publication Data

US 2010/0067518 A1  Mar. 18, 2010

(51) Int. Cl.
*H04L 12/18* (2006.01)
(52) U.S. Cl.
CPC .................................. *H04L 12/185* (2013.01)
(58) Field of Classification Search
None
See application file for complete search history.

(56) References Cited

U.S. PATENT DOCUMENTS

| | | | |
|---|---|---|---|
| 5,414,455 A | 5/1995 | Hooper et al. | |
| 5,442,390 A | 8/1995 | Hooper et al. | |
| 5,940,391 A * | 8/1999 | Malkin et al. | 370/390 |
| 6,611,872 B1 * | 8/2003 | McCanne | 709/238 |
| 6,677,864 B2 * | 1/2004 | Khayrallah | 341/50 |
| 7,031,326 B1 * | 4/2006 | Shur | H04L 12/1831 370/351 |
| 7,133,922 B1 | 11/2006 | She et al. | |
| 7,174,334 B2 * | 2/2007 | Cherkasova | |
| 7,606,227 B2 * | 10/2009 | Fukushima | H04L 12/184 370/351 |
| 7,643,506 B2 * | 1/2010 | Cantenot | H04L 12/185 370/351 |
| 7,746,814 B2 * | 6/2010 | Caviglia | H04L 12/185 370/238 |
| 7,843,896 B2 * | 11/2010 | Shimizu | H04L 12/185 370/351 |
| 7,934,008 B2 * | 4/2011 | Tabatabai et al. | 709/231 |
| 7,969,979 B2 * | 6/2011 | Fuchs et al. | 370/390 |
| 2001/0037256 A1 * | 11/2001 | Yazawa | 705/26 |
| 2003/0088696 A1 * | 5/2003 | McCanne | 709/238 |
| 2004/0081125 A1 * | 4/2004 | Ranta-Aho et al. | 370/335 |
| 2005/0152271 A1 * | 7/2005 | Rindborg | H04L 12/185 370/230 |
| 2006/0274720 A1 * | 12/2006 | Adams | H04L 12/1836 370/351 |
| 2007/0121574 A1 * | 5/2007 | Igarashi | H04L 12/185 370/351 |
| 2007/0171865 A1 * | 7/2007 | Kato | H04L 12/189 370/329 |
| 2007/0171927 A1 * | 7/2007 | Paik et al. | 370/402 |
| 2008/0134266 A1 * | 6/2008 | Kang | 725/110 |
| 2009/0285096 A1 * | 11/2009 | Yousef | 370/235 |

OTHER PUBLICATIONS

Jon Crowcroft, "Application Level Multicast Architectural Requirements for Apex", downloaded from the Internet, <URL: http://ftp.ist.pt/pub/drafts/draft-crowcroft-apex-multicast-01.txt>, Dec. 12, 2008, 9 pages. dated Oct. 2, 2001.

Takeshi Sano et al., "Improving Effeciency of Application-level Multicast with Network Support", downloaded from the Internet, <URL: http://cat.inist.fr/?aModele=afficheN&cpsidt=15670193>, Dec. 12, 2008 (abstract only), 2 pages.

* cited by examiner

*Primary Examiner* — Marsha D Banks Harold
*Assistant Examiner* — Hooman Houshmand
(74) *Attorney, Agent, or Firm* — Finch & Maloney PLLC (57) ABSTRACT

Systems, methods, and computer-program products enable multicasts. Data corresponding to a multicast from a source is received from a native multicast address. Other data corresponding to the multicast from the sources is also received from a mesh network. The data and the other data is assembled to generate combined data, and at least some of the combined data is stored or displayed.

31 Claims, 3 Drawing Sheets

MULTICAST SYSTEMS, METHODS, AND COMPUTER PROGRAM PRODUCTS

BACKGROUND

The present disclosure relates to multicast systems, methods, and computer program products.

Multicasting is the ability of one source or multiple sources to send a stream of information (e.g., audio, video or data) to a plurality of recipients, and often, a large number of recipients. One way multicasting is effected on the Internet is native network multicasting that uses an address range reserved for multicasting. If packets are transmitted into a multicast enabled network with a multicast address as the destination, then all computers subscribed to the multicast regardless of their location may receive the packets. Unfortunately, however, such native network multicasting isn't enabled throughout the entire Internet. For instance, native network multicasting may work inside a corporate or local area network but may not work in between different networks. Many ISPs, for instance, are not multicast enabled.

Another method of multicasting, application level multicasting, uses an overlay on top of a network, such as an IP network, to effect multicasting. Traffic is forwarded from a single source to multiple destinations through the overlay network. The overlay uses computing nodes arranged in trees, meshes, rings, arbitrary random topologies, and other distributed structures. Each node permits the receipt and rebroadcast, to other nodes, of messages. Overlays provide an advantage over all destination computers connecting to the single source because the use of nodes to forward information to other nodes offloads delivery requirements from a server to nodes (e.g., peer computers) in a network. For instance, a tree of nodes can be built, such that each node can transmit data to two or more other nodes. This permits dozens of participates with only one source stream.

Existing systems that permit application level multicasting are unable to use a native network multicast, even if it is available. Thus, application level and native networking multicasting have been alternative and mutually exclusive mechanisms for multicasting.

SUMMARY

This specification describes technologies relating to multicasts. In particular, systems, methods, and computer program products include a service that can participate in both an application multicast and a native multicast. For instance, when participating in the application multicast, the service can receive data for display to a user and also transmit data, such as audio and video, to a large number of other devices. The service can also receive data directly from a native network multicast, such as a native IP multicast. Once a data stream is identified, the stream includes all of the data required to identify and join an application level multicast and all of the data required to identify and receive information over a native multicast.

In general, one aspect of the subject matter described in this specification can be embodied in a computer-implemented method including receiving data from a first source over a first network, the data corresponding to a multicast, receiving other data from a second source over a second network, the other data corresponding to the multicast, and assembling the data and the other data to generate combined data, where at least some of the data and the other data is identical.

Another aspect of the subject matter described in this specification can be embodied in a computer-implemented method including receiving data from a native multicast address, the data corresponding to a multicast from a source, receiving other data from a mesh network, the other data corresponding to the multicast from the source, assembling the data and the other data to generate combined data, and storing at least some of the combined data.

According to one feature, the method can also include forwarding the data received from the native multicast source to a computing device on the mesh network. According to another feature, the method can include decoding the received data and the received other data. The method can also include determining if the received other data has been previously received in the received data.

According to yet another feature, the method can include transmitting an instruction to a computer in the mesh network when the received other data has been previously received in the received data, the instruction requesting that the computer not transmit additional other data. Moreover, the method can include determining if the received data has been previously received in the received other data. According to another feature, the method can include transmitting the received data to a computing device on the mesh network when the received data has not been received in the received other data.

According to one feature, the received data and the received other data includes metadata and payload data. The received data and the received other data can include sequence numbers, and assembling the data and the other data can be based on the sequence numbers. The method can also include displaying at least some of the combined data, for instance, to a user. According to a feature, each of the received data and the received other data identify the source.

According to another aspect, the subject matter described in this specification can be embodied in a computer-implemented method including generating, at a source, a plurality of multicast data fragments, each multicast data fragment including a sequence number and data. The method can also include transmitting at least some of the plurality of multicast data fragments to a computer on a mesh network, and transmitting at least some of the plurality of multicast data fragments to a native multicast address accessible by the computer, where the computer is configured to assemble the plurality of multicast data fragments using the plurality of sequence numbers.

According to a feature, the method can also include encoding the plurality of multicast data fragments. The multicast data fragments can be encoded with a stream description. According to another feature, each multicast data fragment can include the identity of a speaker or the identity of the source. The stream description can also identify the source and/or identify the native multicast address. Additionally, the data can include audio data or video data. According to yet another feature, the method can include receiving an instruction from the computer that at least one of the multicast data fragments has been previously received by the computer.

According to another aspect, the subject matter described in this specification can be embodied in a computer-implemented method including receiving data from a native multicast address, the data corresponding to a multicast from a source, determining if the received data has been previously received from one or more computers on a mesh network, and if the received data has not been previously received from the one or more computers, transmitting at least some of the received data to at least some of the one or more computers on the mesh network.

According to a feature, the data can include at least one sequence number and audio or video data. According to another feature, the method can also include encoding the data prior to transmitting it to at least some of the one or more computers on the mesh network. Encoding the data can also include encoding the data into a plurality of multicast data fragments. Additionally, each multicast data fragment can include the identity of a speaker or the identity of the source. According to yet another feature, the method can include displaying at least some of the received data. According to still another feature, determining if the received data has been previously received includes determining if a sequence number of the received data matches a sequence number previously received from the one or more computers on the mesh network.

Other embodiments of the above aspects include corresponding systems, apparatus, and computer program products.

Particular implementations of the subject matter described in this specification can realize one or more of the following advantages. Data can be simultaneously received over an application multicast mesh and over a native multicast and can be combined for viewing. Where the service is part of an application multicast mesh, the service can redistribute data to other nodes on the application multicast mesh. Users don't have to be concerned where the data is coming from or whether a native multicast is working. Additionally, users do not have to change applications to view application level and native multicasts, and video formats, codecs, and the like. Further, when a native multicast is available, the application multicast mesh can be quiescent, at least in the portions of the network where native is available, which can reduce the bandwidth stress on the network in those portions.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
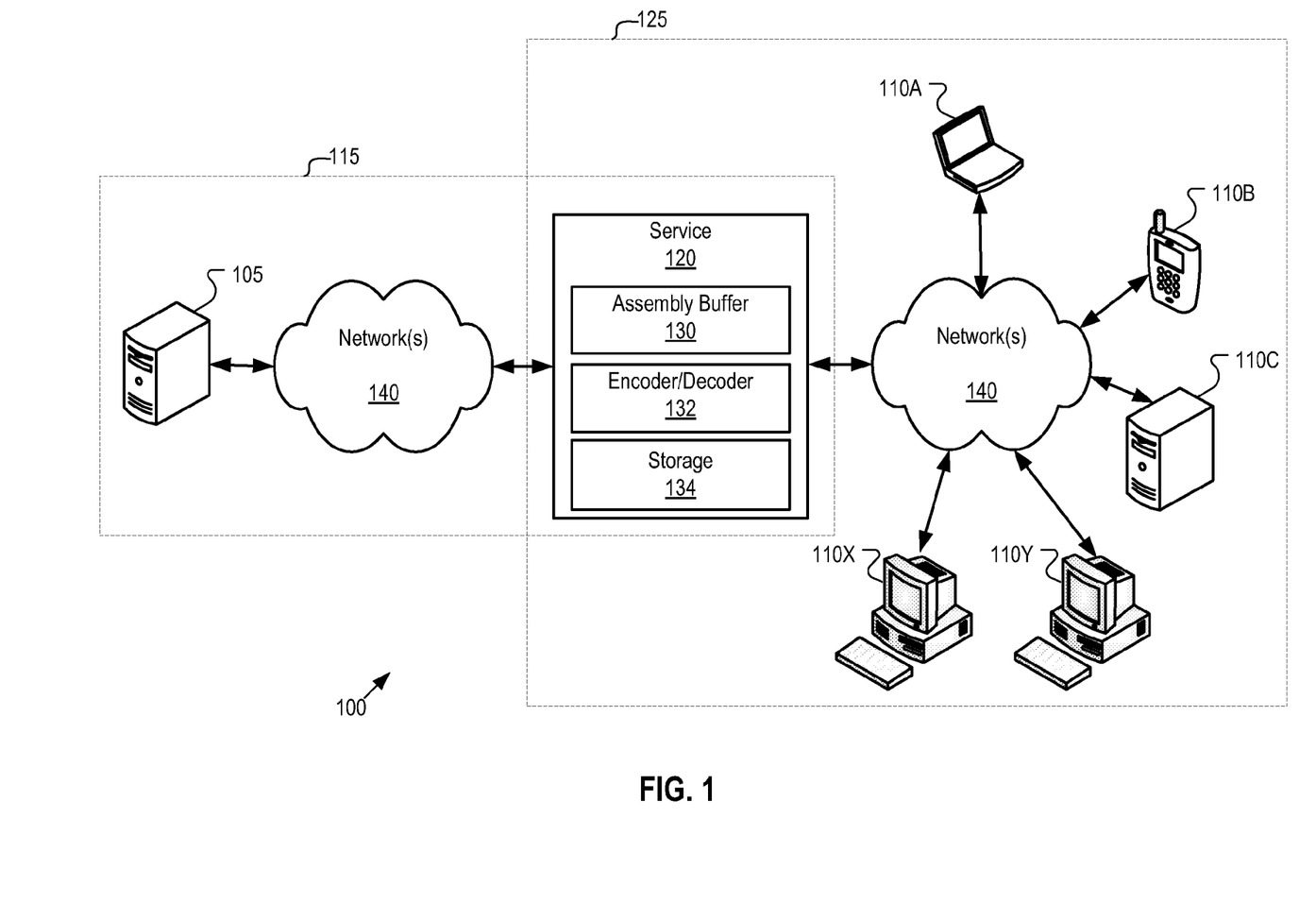
FIG. 1 shows an example system for receiving, viewing, and/or redistributing a multicast.

FIG. 1 shows an example system 100 for receiving, viewing, and/or redistributing a multicast. The system generally includes a multicast service 120 and computing platforms 105, 110 in communication with the service 120 for effecting, simultaneously, both native multicasting (e.g., IP multicasting) and application multicasting. According to some implementations, the multicast service 120 can represent an application, including software, residing on a computing platform. Like the other computing platforms 105, 110, the multicast service 120 can engage in peer-to-peer communications.

The system 100 shown in FIG. 1 includes a native network 115, such as an IP multicast network, and a mesh network 125 (also referred to herein as a 'mesh network' or a 'peer to peer network') to effect application level multicasting. Although the present disclosure is described with respect to native networks and mesh networks, it will be appreciated that various sources and networks can be used to effect the present invention. For instance, a multicast from two or more networks, including a native IP multicast, mesh network, satellite broadcast network, cellular network, and the like, can be combined to generate a single stream.

A. The Native Network

An IP multicast can occur on the native network 115. As is known in the art, IP multicasting is a technique for 'one to many' communication over an IP infrastructure. Although multicasting may be used to effect transmissions to thousands of receivers, the term may also include transmission to as few as two receivers. A source computer, such as source computing device 105, can transmit data to a population of receivers, including, for instance, the service 120, without prior knowledge of the service 120 or other receivers. IP multicasting utilizes an IP multicast group address. A source uses the group address as the IP destination address in transmitted data packets, and receivers use the group address to inform the network that they are interested in receiving packets sent to that group. Thus, the service 120 can subscribe to the IP multicast group address to receive data transmitted to the address from the source computing device 105. In particular, the sending source 105 sends data to the multicast address, and one or more routers within the network(s) make copies of the data, transmitting the data to all receivers (including service 120 and any other receivers) that have registered their interest in data from that source.

The network(s) 140 can include one or more public networks (e.g., the Internet or the public switched telephone network), one or more private networks (e.g., an enterprise network or a virtual private network), or a combination of both. The service 120 can be a single server computer or multiple server computers (e.g., a server cluster, a server farm, or distant server computers linked through a network).

B. The Mesh Network

The mesh network 125 is a net-like network configuration of computing nodes. In some implementations, as part of the mesh network 125, the service 120 may attempt to join and/or establish a peer-to-peer network with one or more other computing devices 110. For example, the service 120 may execute one or more instructions allowing the service 120 to join and/or establish a peer-to-peer network. For instance, the service 120 may execute instructions for communicating with a particular computing device, such as computing device 110A. The service 120 may request information from the computing device 110A at least in part to determine one or more aspects relating to a peer-to-peer network, such as a peer to peer file network. In some implementations the peer-to-peer network may utilize a self organizing network topology, as discussed more fully below. Although not illustrated as such in FIG. 1, the source computing device 105 may also be part of the mesh network 125.

A "self organizing network topology" as used herein may refer to a network topology wherein computing devices determine a network topology based at least in part on direct communication between peer nodes. For example, peer nodes may directly communicate with one another to share information regarding other peer nodes available on the peer-to-peer network, so that individual peer devices gather information regarding the network topology on their own without communicating with a tracking computing device, such as a tracking server. For instance, the service 120 may request information relating to one or more other peer nodes available for communication and/or one or more file portions available at those nodes. Furthermore, the service 120 may, under some circumstances, additionally request information relating to one or more performance characteristics of those nodes, such as a latency time associated with those one or more nodes. In one embodiment, the service 120 may request information relating to file portions available at those nodes and/or determine performance characteristics of those nodes based, at least in part, on direct communication with those nodes.

In some implementations the computing device 110A may reply with information relating to one or more additional peer nodes, such as computing devices 110B, 110C, and/or 110X. For example, the computing device 110A may provide the service 120 with a network location for computing devices 110B and/or 110C, such as information sufficient for service 120 to contact computing devices 110B and/or 110C, including one or more names for the devices, and/or one or more URL's associated with the devices. In addition, computing device 110A may provide service 120 with information relating to file portions available at the respective computing devices. Though, again, service 120 may obtain this information directly from computing devices 110B and/or 110C. In addition, computing device 110A may provide the service 120 with information relating to communications latency associated with computing devices 110B and/or 110C. However, under some circumstances service 120 may determine communications latency through direct communication with computing devices 110B and/or 110C.

Having information relating to computing devices 110B and/or 110C, the service 120 may attempt to communicate with those communication devices as well, such as to identify one or more additional nodes available for communication. For example, the service 120 may contact computing device 110B and/or 110C and request information relating to one or more additional nodes available for communication. Computing devices 110B and/or 110C may respond with information relating to additional computing devices 110X and/or 110Y, such as the information relating to network location of computing devices 110X and/or 110Y, for example. In this particular embodiment, the service 120 may continue to contact available computing devices until it has identified a desirable number of computing devices available for communication. Such a number of available nodes that are desirable may vary depending upon one or more desired aspects of the peer-to-peer network, network latency, bandwidth, including file transfer time, and/or network reliability, etc.

In addition, in response to requests for information from a particular node, that particular node may likewise request the same type of information from the requesting node. For example, if the service 120 requests information about available nodes from computing device 110A, then computing device 110A may likewise request that service 120 provide the same type of information about nodes known to service 120. Alternatively, the service 120 may provide this information along with its own request for information. It should, however, be noted that this is merely an illustrative example relating to establishing and/or joining a peer-to-peer network employing a self organizing network topology and that claimed subject matter is not limited in this regard.

In one particular embodiment, the service 120 may attempt to assemble one or more files. In this embodiment, the service 120 may, for example, already have one or more portions of a desired file. Based on the information gathered in the discussion above, the service 120 may contact various computing devices on the network 100, such as computing devices 110 for one or more particular portions of the file. For example, while gathering information about the network, the service 120 may have learned that a particular portion of a file is stored at computing device 110X. Accordingly, while attempting to assemble the file, service 120 may request that computing device 110X provide that particular portion of the file. In this embodiment, the service 120 may continue to contact other computing devices until it has assembled the desired file.

In accordance with an embodiment, the service 120 may intermittently contact one or more of the identified computing devices at least in part to evaluate network topology, such as by gathering information relating to peer nodes available for communication. For example, in some peer-to-peer networks peer nodes may become unavailable due to a variety of circumstances at one or more times. In addition, new computing devices may join the network from time to time and be available for communication as peer nodes. For example, users of the network may log on and/or log off the network from time to time. Furthermore, conditions associated with one or more peer nodes may change from time to time. For example, a communication latency associated with one of the nodes, such as computing device 110X, may change over time, due to a variety of factors, including local conditions associated with computing device 110X and/or network conditions associated with computing device 110X. Accordingly, it may be desirable for the service 120 to intermittently determine information about computing devices available for communication, at least in part to determine updated characteristics of network 125.

Frequency of determining updated characteristics of the network may vary due to a number of factors. These factors may include the nature of the computing devices, the frequency with which computing devices join and/or leave the network, the nature of the function provided by a particular program employing the peer-to-peer network, and/or the reliability of the computing devices that are part of the peer-to-peer network. For example, under some circumstances it may be desirable to update the list of computing devices identified for communication as frequently as every few seconds, such as every 10 seconds. In some implementations, the service 120 may randomly choose one of the identified computing devices every, for instance, 10 seconds and request information about other computing devices from that randomly chosen computing device. In other embodiments it may be desirable to update the identified computing devices less frequently, such as every few minutes or so.

Once the identified computing devices have been updated, the service 120 may again attempt to assemble a desired file, such as by requesting one or more portions of the file from the second group of peer devices, for example. As the group of identified computing devices is updated, and as the service 120 continues to request missing file portions, the desired file should eventually be assembled by the service 120, assuming all portions are stored somewhere on the network. It should be noted, that although the above was described in terms of the service 120, any computing device on the network may perform similar action, such as identifying groups of available peer devices, requesting file portions from one or more of the identified peer devices, updating the identified groups, etc. Accordingly, at any one time any node may be publishing a file portion or rendering a file portion. In addition, the role of a particular peer device will vary over time such that at one point a peer device may be publishing a file portion, while at another point that same peer device may be rendering a file portion.

C. Redundancy of the Native Network and the Mesh Network

The service 120 shown in FIG. 1 can participate in both the mesh network 125 and the native network 115 simultaneously. Once a data stream is identified by the service 120, the service 120 can use the stream to identify and join a mesh network 125 multicast and can subscribe to a native network 115 multicast. The service 120 is operable to combine the data received over the networks 115, 125 into single stream.

Participating in both the mesh network 125 and the native network 115 simultaneously permits the service 120 to achieve advantages provided by both. Because the service 120 is a participant in the mesh network 125, a source that transmits data (e.g., a broadcaster) can use less of its own server bandwidth to send video to computing devices 110 on the mesh network 125 because the service 120 contributes some of its upload ability to send data to other computing devices on the mesh network 125. Additionally, because the service 120 can participate in the native network 115, the service 120 can receive IP multicasts, which typically have lower latency and less lost data than mesh network multicasts. Once the service 120 receives a description of a stream, the service 120 can join a mesh network multicast and a native multicast without requiring a user to configure the service 120 to join one or both.

The service 120 can use data received over both networks to ensure that the service 120 receives all of the data intended for receipt by the service. Furthermore, the service 120 can receive data from the native network 115, such as from a native multicast address, and can transmit that received data to one or more computers 110 on the mesh network 125 if the service 120 determines that the received data has not been previously received from the one or more computers 110 on the mesh network. The service 120 can redistribute data received over the native network 115 to computing devices 110 on the mesh network 125, the service 120 becomes a seed to the mesh network 125.

As explained in detail below, the service 120 includes an assembly buffer 130 to assemble data received from the native network 115 and the mesh network 125. For instance, data received from both networks can correspond to the same multicast originating from a source. In some implementations, the data includes datagrams (or 'data fragments') that include metadata and payload data (e.g., audio, video, etc.) for a multicast. The datagrams can each include sequence numbers so that they may be assembled in order by the service 120, and in particular, by the assembly buffer 130.

The service 120 also includes a storage 134 for storing data received over the networks 115, 125. The storage may provide temporary or permanent storage for the service 120, and thus may represent RAM, ROM, or other forms of memory. Data may be stored prior to display to a user associated with the service, for instance, using a display device coupled to the service 120. Additionally, data may be stored prior to transmission to one or more computers 110 on the mesh network 125.

As is shown in FIG. 1, the service 120 also includes an encoder/decoder 132. The encoder/decoder 132 permits the service to encode data for transmission to the other computers 110 on the mesh network 125 in a format suitable for receipt by those computers 110, and to decode information received over the mesh 125 and native 115 networks. The encoder/decoder 132 permits the service 120 to become the source to other computing devices, including those in both the native network 115 and the mesh network 125. The function of the encoder/decoder 132 is explained in greater detail with respect to FIG. 3.

Figure 2:
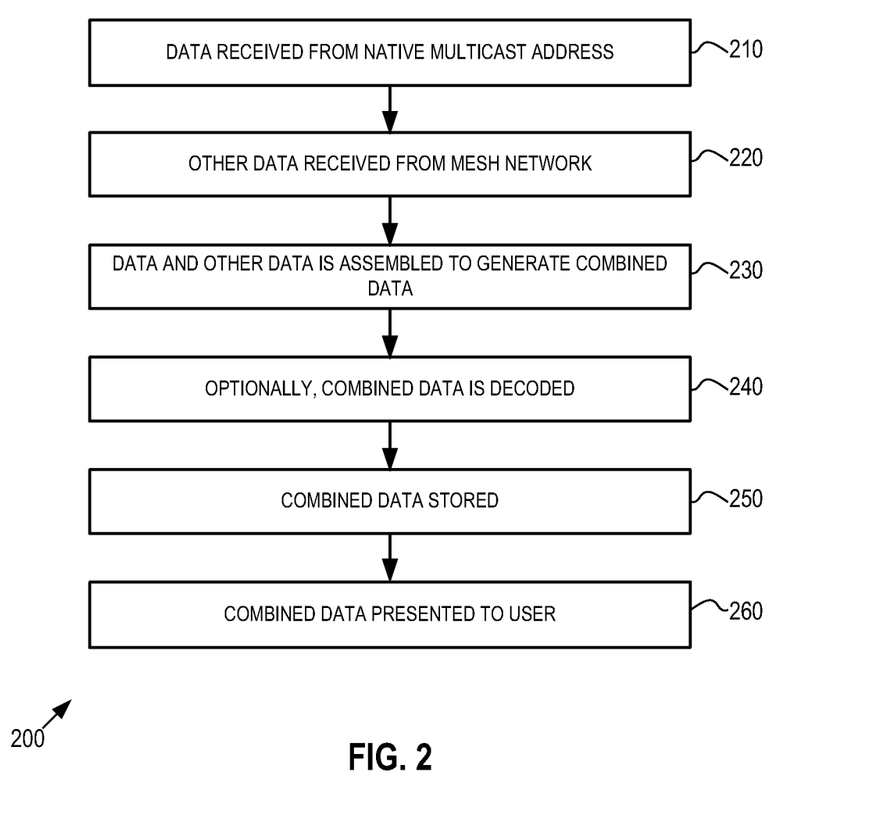
FIG. 2 shows an example high level process for receiving data from a source over a native network and a mesh network.

FIG. 2 shows an example high level process 200 for receiving data from a source over a native network and a mesh network. The process may be implemented, for instance, by the service 120 in the system 100 described above with respect to FIG. 1.

Data is received from a native multicast address, where the data corresponds to a multicast from a source (210). For instance, the service 120 can receive data from the address after subscribing to a native multicast. Next, other data is received from a mesh network, where the other data corresponds to the same multicast from the source (220). For instance, the service 120 can receive the other data from one or more computing devices 110 on the mesh network 125, where the other data corresponds to the multicast from the same source. According to some implementations, the source can represent a publisher of a multicast.

Next, the data received from the native multicast address and the other data received from the mesh network is assembled (230) to generate combined data. A portion or all of the combined data may optionally be forwarded to one or more computers, such as computers 110 on the mesh network 125. According to some implementations, the service 120 combines the data using an assembly buffer 130. The combined data is optionally decoded (240), and is stored (250), for instance, by the service 120 in a storage 134. The combined data can then be presented to a user via a display or audio device (260).

Figure 3:
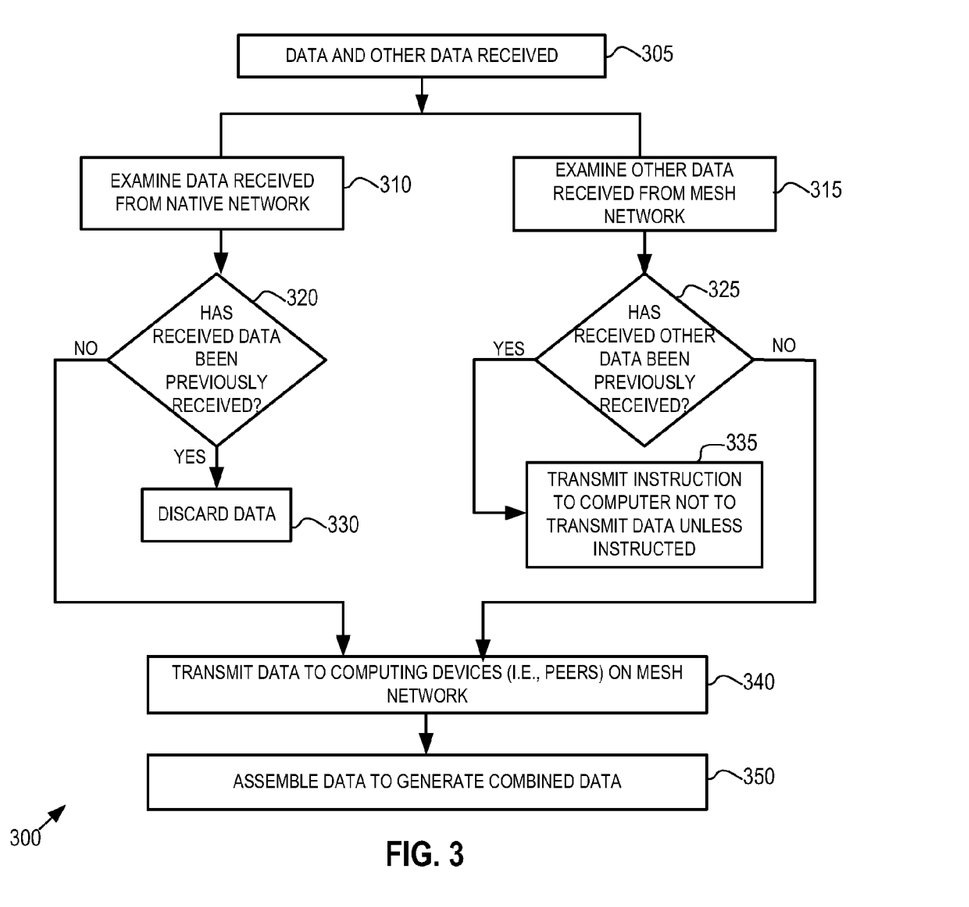
FIG. 3 shows an example process for assembling received data and transmitting data received over a native network to computing devices on a mesh network.

FIG. 3 shows an example process 300 for assembling received data and transmitting data received over a native network to computing devices on a mesh network. The example process 300 can represent block (230) shown in FIG. 2.

As described above, data received over a native network and a mesh network can be combined by the service 120 to generate a single data stream, which can serve to reduce the amount of data dropped as compared, for instance, to systems in which data is received only over a single network. Additionally, the service 120 can receive data from a native network, such as from a native multicast address, and can transmit that received data to one or more computers on the mesh network if the service 120 determines that the received data has not been previously received from the one or more computers on the mesh network. Thus, the service 120 can become a seed to a mesh network.

As shown in FIG. 3, the data and other data is received from the native network and mesh network, respectively. Thereafter a determination is made whether any of the data or other data has been previously received, for instance, by the service 120.

A determination is made if the received data, received from the native network, has been previously received, for instance, in the data received from the native network or in the other data received from the mesh network (310, 320). For instance, the service 120 can determine if the data has already been received by examining previously received data and other data. Although the data and other data are received over different networks, both contain the same data fragments organized by sequence numbers. Thus, for instance, a data fragment received over the native network and having a sequence number '3291' is the same as a data fragment received over the mesh network and having the same sequence number, '3291'. As a result, the service 120 can identify that the data has been previously received if the data corresponds to a data fragment for the same multicast (e.g., identified by a unique number, code, etc., corresponding to the multicast as generated by the publisher) and having a sequence number associated with a data fragment that has been previously received by the service 120. The service 120 may access data fragments stored in the storage 134 to determine if a data fragment has been previously received. If the native network data has been previously received it is discarded (330). Otherwise, the data is transmitted to computing devices on the mesh network 125. According to some implementations, the data is transmitted by the service 120 to the computing devices on the mesh network. According to some implementations, the data is forwarded only to those computing devices on the mesh network 115 that have not already requested that the service 120 not transmit data to the devices.

A determination is also made if the received other data, received from a computer on the mesh network, has been previously received, for instance, in the data received from the native network or from another computer on the mesh network (325). This determination is executed in the same manner as described in the previous paragraph; for instance, the service 120 can determine if the other data has already been received by examining the data fragments, and in particular, their sequence numbers to identify if a data fragment has been previously received.

Next, if the other data has been previously received, an instruction is transmitted to the computer in the mesh network requesting that the computer not transmit additional other data unless requested to do so (335). For instance, the service 120 can transmit such instructions to any computing devices in the mesh network 125 that attempt to send the service 120 data fragments that the service 120 has previously received over the native network 115. These instructions result in a reduction of traffic over the mesh network 125.

Although the instruction may request that a computer in the mesh network cease to transmit data, this instruction may be limited to payload data for a multicast (e.g., audio and/or video payload data), and not metadata, such as sequence numbers or other status data that identifies what information is received and/or known to the computer. In this way, the service 120 can maintain visibility into the mesh network 125 to understand what data is received and/or available to computing devices in the mesh network 125. As an example, a computer in the mesh network may continue to transmit sequence numbers (or only some sequence numbers, such as every $8^{th}$ sequence number) so that the service 120 will be able to identify which computing device is receiving data and what that data is. This information is also helpful if the service 120 loses data and needs to retrieve the data from a computing device in the mesh network 125. Additionally, according to some implementations, the request to a computer not to transmit data may be a request not to transmit data for only a limited period of time.

If the other data has not been previously received, the data is transmitted to computing devices on the mesh network 125. According to some implementations, the data is transmitted by the service 120 to the computing devices on the mesh network. According to some implementations, the data is forwarded only to those computing devices on the mesh network 115 that have not already requested that the service 120 not transmit data to the devices.

The data is also assembled, for instance, by the assembly buffer 130 (350). The assembly buffer may buffer new data prior to transmitting it, for instance, to a codec or another device before the data can be presented to a user, for instance, via a display device.

Figure 4:
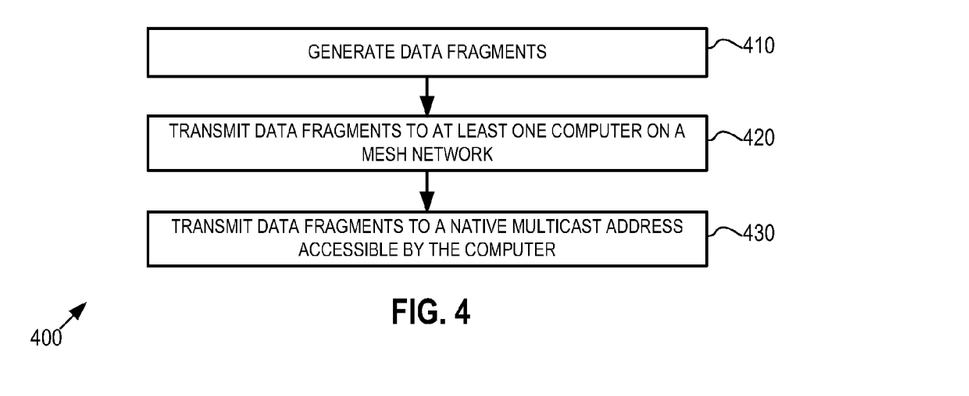
FIG. 4 shows an example process of generating multicast data for transmission to a native network multicast address and to computing devices on a mesh network.

FIG. 4 shows an example process 400 of generating multicast data for transmission to a native network multicast address and to computing devices on a mesh network. A plurality of multicast data fragments are generated (410), for instance, by encoding data. For instance, the source 120 can generate the multicast data fragments using the encoder/decoder 132. According to some implementations, each multicast data fragment is encoded with a sequence number and data. According to some implementations, each multicast data fragment can be encoded with the identity of a speaker or the identity of the source. Still other information relating to a multicast can be encoded in the multicast data fragments, including a stream description, permissions (e.g., what users can insert data), information identifying a native IP multicast, and the like. This information may be encoded, for instance, using an extensible format.

Next, at least some of the multicast data fragments are transmitted to a computer on a mesh network (420). At least some of the multicast data fragments are transmitted to a native multicast address accessible by the computer (430). According to some implementations, the data fragments are packaged in a native IP packet for transmission to the native multicast address. Additionally, it will be appreciated that the multicast data fragments transmitted over each of the native network and the mesh network may be the same; thus, the fragments transmitted over each network can include all of the data necessary for a multicast.

Embodiments of the subject matter and the functional operations described in this specification can be implemented in digital electronic circuitry, or in computer application, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single application product or packaged into multiple application products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
    receiving data from a first source over a first network, the data corresponding to a multicast;
    receiving other data from a second source over a second network, the other data corresponding to the multicast; and
    assembling the data and the other data to generate combined data, wherein at least some of the data and the other data are identical.

2. The method of claim 1, wherein the first source comprises a native multicast address to which a native network computer transmits the data corresponding to the multicast using native multicasting.

3. The method of claim 2, wherein the second network comprises a mesh network over which a mesh network computer transmits the other data corresponding to the multicast using application-level multicasting.

4. The method of claim 1, wherein the first network comprises a satellite broadcast network.

5. The method of claim 1, further comprising forwarding the data received from the first network to a computing device on the second network.

6. The method of claim 1, further comprising decoding the received data and the received other data.

7. The method of claim 1, further comprising determining if the received other data has been previously received in the received data.

8. The method of claim 1, further comprising transmitting an instruction to a computer in the second network when the received other data has been previously received in the received data, the instruction requesting that the computer not transmit additional other data.

9. The method of claim 1, further comprising determining if the received data has been previously received in the received other data.

10. The method of claim 9, further comprising transmitting the received data to a computing device in the second network when the received data has not been received in the received other data.

11. The method of claim 1, wherein the received data and the received other data comprise metadata and payload data.

12. The method of claim 11, wherein the received data and the received other data comprise sequence numbers, and wherein assembling the data and the other data is based on the sequence numbers.

13. The method of claim 1, further comprising displaying at least some of the combined data.

14. The method of claim 1, wherein each of the received data and the received other data identify a source of the multicast.

15. A computer-implemented method, comprising:
receiving data from a native multicast address, the data corresponding to a multicast from a source;
receiving other data from a mesh network, the other data corresponding to the multicast from the source;
determining if the received other data has been previously received in the received data; and
assembling the data and the other data to generate combined data.

16. The method of claim 15, further comprising transmitting an instruction to a computer in the mesh network when the received other data has been previously received in the received data, the instruction requesting that the computer not transmit additional other data.

17. The method of claim 15, further comprising determining if the received data has been previously received in the received other data.

18. The method of claim 17, further comprising transmitting the received data to a computing device on the mesh network when the received data has not been received in the received other data.

19. The method of claim 15, wherein:
the received data and the received other data comprise metadata and payload data;
the received data and the received other data comprise sequence numbers; and
assembling the data and the other data is based on the sequence numbers.

20. A computer-implemented method, comprising:
generating, at a source, a plurality of multicast data fragments, each multicast data fragment comprising a sequence number and data;
transmitting at least some of the plurality of multicast data fragments to a computer on a mesh network;
transmitting at least some of the plurality of multicast data fragments to a native multicast address accessible by the computer; and
receiving an instruction from the computer that at least one of the multicast data fragments has been previously received by the computer, wherein the computer is configured to assemble the plurality of multicast data fragments using the plurality of sequence numbers.

21. A computer-implemented method, comprising:
receiving data from a native multicast address, the data corresponding to a multicast from a source;
determining if the received data has been previously received from one or more computers on a mesh network; and
if the received data has not been previously received from the one or more computers, transmitting at least some of the received data to at least some of the one or more computers on the mesh network.

22. The method of claim 21, wherein the data comprises at least one sequence number and audio or video data.

23. The method of claim 21, further comprising encoding the data prior to transmitting it to at least some of the one or more computers on the mesh network.

24. The method of claim 23, wherein encoding the data comprises encoding the data into a plurality of multicast data fragments.

25. The method of claim 24, wherein each multicast data fragment comprises the identity of a speaker or the identity of the source.

26. The method of claim 21, further comprising displaying at least some of the received data.

27. The method of claim 21, wherein determining if the received data has been previously received comprises determining if a sequence number of the received data matches a sequence number previously received from the one or more computers on the mesh network.

28. A non-transitory computer-readable storage medium encoded with a computer program operable to cause a data processing apparatus to perform operations comprising:
receiving data from a native multicast address, the data corresponding to a multicast from a source;
receiving other data from a mesh network, the other data corresponding to the multicast from the source;
determining if the received other data has been previously received in the received data;
assembling the data and the other data to generate combined data; and
storing at least some of the combined data.

29. The non-transitory computer-readable storage medium of claim 28, encoded with the computer program further operable to cause data processing apparatus to perform operations comprising:
transmitting an instruction to a computer in the mesh network when the received other data has been previously received in the received data, the instruction requesting that the computer not transmit additional other data.

30. A non-transitory computer-readable storage medium encoded with a computer program further operable to cause a data processing apparatus to perform operations comprising:
receiving data from a native multicast address, the data corresponding to a multicast from a source;
receiving other data from a mesh network, the other data corresponding to the multicast from the source;
determining if the received data has been previously received in the received other data;
assembling the data and the other data to generate combined data; and
storing at least some of the combined data.

31. The non-transitory computer-readable storage medium of claim 30, encoded with the computer program further operable to cause data processing apparatus to perform operations comprising:
transmitting the received data to a computing device on the mesh network when the received data has not been received in the received other data.

* * * * *